US012534337B2

(12) United States Patent
Wallis, II et al.

(10) Patent No.: US 12,534,337 B2
(45) Date of Patent: Jan. 27, 2026

(54) HARDWARE SYSTEM FOR TOUCH FREE ELEVATOR OPERATION

(71) Applicant: MWS Fabrication, Inc., San Dimas, CA (US)

(72) Inventors: Thomas G. Wallis, II, Glendora, CA (US); Antonio Marin-Lopez, Redlands, CA (US); Thomas C. Wallis, Alta Loma, CA (US); David J. Sandoval, Anaheim, CA (US)

(73) Assignee: MWS FABRICATION, INC., San Dimas, CA (US)

( * ) Notice: Subject to any disclaimer, the term of this patent is extended or adjusted under 35 U.S.C. 154(b) by 1001 days.

(21) Appl. No.: 17/685,625

(22) Filed: Mar. 3, 2022

(65) Prior Publication Data

US 2022/0281715 A1 Sep. 8, 2022

Related U.S. Application Data

(60) Provisional application No. 63/156,449, filed on Mar. 4, 2021.

(51) Int. Cl.
*B66B 1/46* (2006.01)
*B66B 1/14* (2006.01)
(Continued)

(52) U.S. Cl.
CPC ................ *B66B 1/468* (2013.01); *B66B 1/14* (2013.01); *B66B 1/3461* (2013.01); (Continued)

(58) Field of Classification Search
CPC ......... B66B 1/468; B66B 1/14; B66B 1/3461; B66B 19/007; B66B 2201/4646
See application file for complete search history.

(56) References Cited

U.S. PATENT DOCUMENTS 8,151,942 B2 * 4/2012 Rusanen ................. B66B 1/468 187/247
2006/0086573 A1 4/2006 Motoyama et al.
(Continued)

FOREIGN PATENT DOCUMENTS

WO WO2018127826 7/2018

OTHER PUBLICATIONS

Kim, Harry; International Search Report and Written Opinion; May 17, 2022; 11 pages; Alexandria, VA.

*Primary Examiner* — Rina I Duda
(74) *Attorney, Agent, or Firm* — STETINA GARRED BRUCKER & NEWBOLES

(57) ABSTRACT

An apparatus for retrofitting an elevator system to enable voice control includes a first main board installable within an elevator adjacent to an elevator button panel and two or more additional main boards installable on respective floors adjacent to respective elevator call panels, each of the main boards having a microphone circuit, a plurality of onboard output relays, and a processor operable to select an output relay in response to a voice command received by the microphone circuit and to output a signal to the selected output relay. One or more auxiliary output relay boards are installable within the elevator adjacent to the elevator button panel, each having a plurality of additional output relays selectable by the processor of the first main board. A controller area network (CAN) bus connects the first main board to the one or more auxiliary output relay boards.

20 Claims, 4 Drawing Sheets

(51) Int. Cl.
*B66B 1/34* (2006.01)
*B66B 19/00* (2006.01)

(52) U.S. Cl.
CPC ...... *B66B 19/007* (2013.01); *B66B 2201/463* (2013.01); *B66B 2201/4646* (2013.01)

(56) References Cited

U.S. PATENT DOCUMENTS

2006/0151256 A1 7/2006 Lee
2009/0043580 A1 2/2009 Mozer et al.
2012/0145487 A1* 6/2012 Yoo ........................ B66B 1/3453 187/380
2012/0279807 A1* 11/2012 Finschi ................. B66B 1/2466 187/384
2015/0041254 A1 2/2015 Finschi
2018/0053504 A1 2/2018 Wang et al.
2020/0216291 A1 7/2020 Okuda

* cited by examiner

HARDWARE SYSTEM FOR TOUCH FREE ELEVATOR OPERATION

CROSS-REFERENCE TO RELATED APPLICATIONS

The present application claims priority to U.S. Provisional Application Ser. No. 63/156,449, filed Mar. 4, 2021, the disclosure of which is incorporated by reference herein.

STATEMENT RE: FEDERALLY SPONSORED RESEARCH/DEVELOPMENT

Not Applicable

BACKGROUND

A voice-controlled elevator has long been a sought-after technology, as evidenced by science fiction imaginings such as the turbolifts featured on Star Trek. Now, at a time when people are particularly concerned about the transmission of pathogens during the ongoing pandemic of coronavirus disease 2019 (COVID-19), voice control functionality is especially desirable because of the hands-free operation that it affords. Unfortunately, even with recent advances in voice recognition software, attempts at bringing a voice-controlled elevator product to market have been unsuccessful. As it turns out, the varied needs of each building, such as the number of floors serviced by the elevator, have made a one-size-fits-all approach impractical, leaving two unsatisfactory alternatives: i) either produce a wastefully designed system with a large amount of unused functionality that only comes into play when the system is installed in a many-floored building requiring complex elevator operation, or ii) custom build each system at great expense.

BRIEF SUMMARY

The present disclosure contemplates various systems and apparatuses for overcoming the above drawbacks accompanying the related art. One aspect of the embodiments of the present disclosure is an apparatus for retrofitting an elevator system to enable voice control. The apparatus may comprise a plurality of main boards (e.g., printed circuit boards) including a first main board installable within an elevator adjacent to an elevator button panel and two or more additional main boards installable on respective floors adjacent to respective elevator call panels. Each of the main boards may have a microphone circuit, a plurality of onboard output relays, and a processor operable to select an output relay from among the plurality of onboard output relays in response to a voice command received by the microphone circuit and to output a signal to the selected output relay. The apparatus may further comprise one or more auxiliary output relay boards installable within the elevator adjacent to the elevator button panel, each of the one or more auxiliary output relay boards having a plurality of additional output relays. The processor of the first main board may be further operable to select the output relay from among the plurality of additional output relays. The apparatus may further comprise a controller area network (CAN) bus connecting the first main board to the one or more auxiliary output relay boards.

The one or more auxiliary output relay boards may be addressable by the processor of the first main board via dual in-line package (DIP) switches. The CAN bus may comprise a three-wire CAN bus. The plurality of additional output relays of each of the one or more auxiliary output relay boards may number fifteen or more. The plurality of onboard output relays of each of the main boards may number four or fewer (e.g., two relays, corresponding to "up" and "down" elevator call functions).

Each of the main boards may have one or more LEDs. The processor of each of the main boards may be operable to illuminate the one or more LEDs in response to a wake-up word received by the microphone circuit.

Each of the main boards may have an onboard input relay circuit connected to a power circuit of the processor. The onboard input relay circuit may be operable to cut power to the processor in response to an input signal (e.g., a signal from an emergency light circuit of the elevator).

Another aspect of the embodiments of the present disclosure is an elevator system retrofitted to enable voice control. The elevator system may comprise an elevator button panel in an elevator, a plurality of elevator call panels on respective floors accessible by the elevator, a controller operable to control the elevator in response to signals received from the elevator button panel and the plurality of elevator call panels, and a first main board installed within the elevator adjacent to the elevator button panel. The first main board may have a microphone circuit, a plurality of onboard output relays connected to the elevator button panel, and a processor operable to select an output relay from among the plurality of onboard output relays in response to a voice command received by the microphone circuit and to output a signal to the selected output relay. The elevator system may further comprise two or more additional main boards installed adjacent to respective elevator call panels from among the plurality of elevator call panels. Each of the two or more additional main boards may have a microphone circuit, a plurality of onboard output relays connected to the respective elevator call panel, and a processor operable to select an output relay from among the plurality of onboard output relays in response to a voice command received by the microphone circuit and to output a signal to the selected output relay. The elevator system may further comprise one or more auxiliary output relay boards installed within the elevator adjacent to the elevator button panel. Each of the one or more auxiliary output relay boards may have a plurality of additional output relays connected to the elevator button panel. The processor of the first main board may be further operable to select the output relay from among the plurality of additional output relays. The elevator system may further comprise a controller area network (CAN) bus connecting the first main board to the one or more auxiliary output relay boards.

The one or more auxiliary output relay boards may be addressable by the processor of the first main board via dual in-line package (DIP) switches. The CAN bus may comprise a three-wire CAN bus. The plurality of additional output relays of each of the one or more auxiliary output relay boards may number fifteen or more. In each of the first main board and the two or more additional main boards, the plurality of onboard output relays may number four or fewer (e.g., two relays, corresponding to "up" and "down" elevator call functions).

Each of the first main board and the two or more additional main boards may have one or more LEDs. In each of the first main board and the two or more additional main boards, the processor may be operable to illuminate the one or more LEDs in response to a wake-up word received by the microphone circuit.

The elevator system may comprise an emergency light circuit in the elevator and an input relay connected to the emergency light circuit and to a power circuit of the processor. The input relay may be operable to cut power to the processor in response to an input signal received from the emergency light circuit.

Another aspect of the embodiments of the present disclosure is a voice-controlled elevator system. The voice-controlled elevator system may comprise a first main board installed in an elevator. The first main board may have a microphone circuit and a processor operable to output a floor select signal in response to a voice command received by the microphone circuit. The voice-controlled elevator system may further comprise two or more additional main boards installed on respective floors accessible by the elevator. Each of the two or more additional main boards may have a microphone circuit and a processor operable to output an elevator call signal in response to a voice command received by the microphone circuit. The voice-controlled elevator system may further comprise a controller operable to control the elevator in response to the floor select signal received from the first main board and the elevator call signals received from the two or more additional main boards. The voice-controlled elevator system may further comprise a controller area network (CAN) bus connecting the first main board, the two or more additional main boards, and the controller. The voice command signal and the elevator call signals may be received by the controller over the CAN bus.

The first main board and the two or more additional main boards may be addressable by the controller via dual in-line package (DIP) switches. The CAN bus may comprise a three-wire CAN bus. Each of the first main board and the two or more additional main boards may have one or more LEDs. In each of the first main board and the two or more additional main boards, the processor may be operable to illuminate the one or more LEDs in response to a wake-up word received by the microphone circuit.

The processor of the first main board may be operable to output a door control signal in response to a voice command received by the microphone circuit. The controller may be operable to control a door of the elevator in response to the door control signal received from the first main board.

The processor of the first main board may be operable to output an emergency signal in response to a voice command received by the microphone circuit. The controller may be operable to control an alarm in response to the emergency signal received from the first main board.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

The present disclosure encompasses various embodiments of voice-controlled elevator systems and apparatuses for retrofitting elevator systems to enable voice control. The detailed description set forth below in connection with the appended drawings is intended as a description of several currently contemplated embodiments and is not intended to represent the only form in which the disclosed invention may be developed or utilized. The description sets forth the functions and features in connection with the illustrated embodiments. It is to be understood, however, that the same or equivalent functions may be accomplished by different embodiments that are also intended to be encompassed within the scope of the present disclosure. It is further understood that the use of relational terms such as first and second and the like are used solely to distinguish one from another entity without necessarily requiring or implying any actual such relationship or order between such entities.

Figure 1:
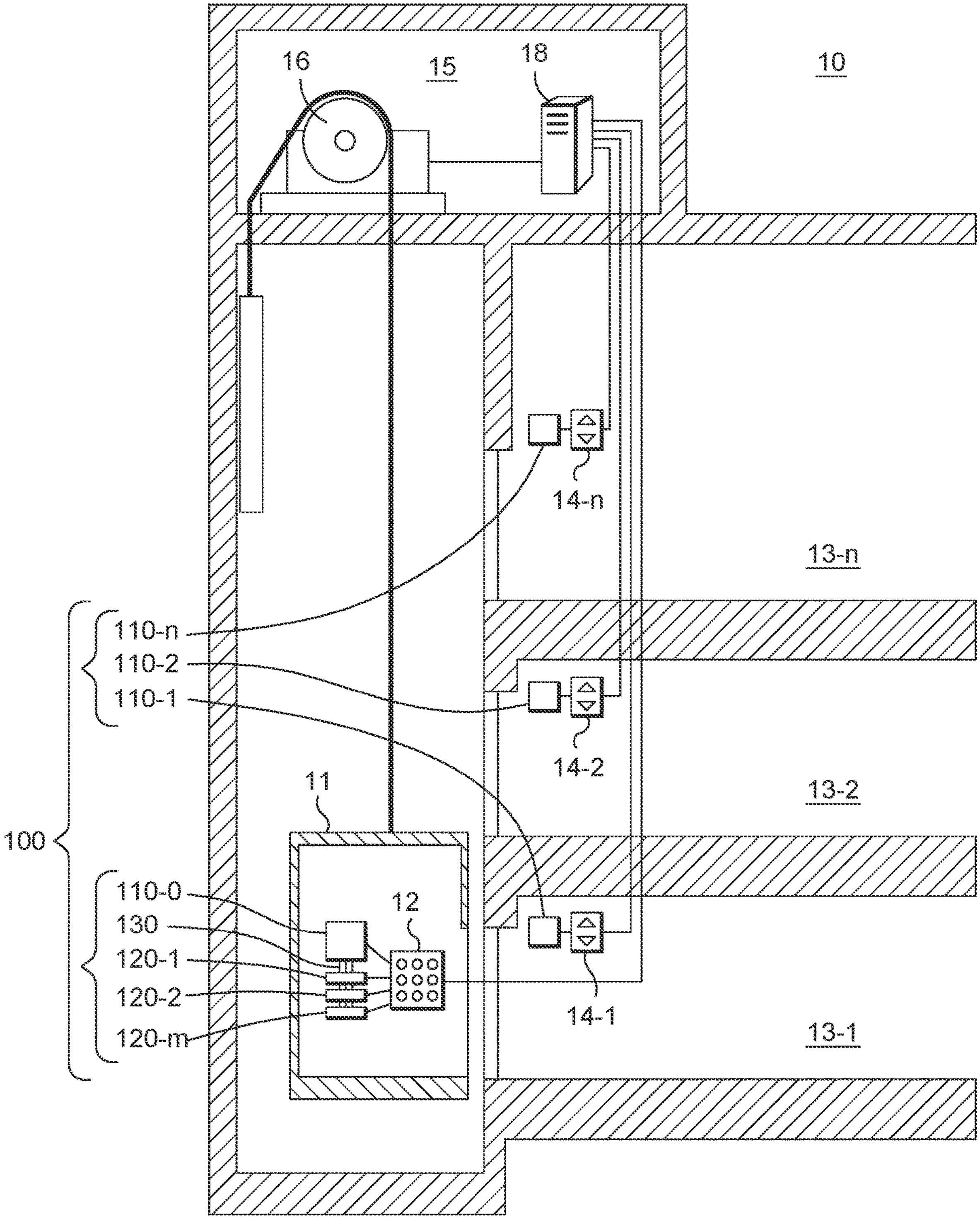
FIG. 1 shows an exemplary elevator system retrofitted to enable voice control according to an embodiment of the present disclosure.

FIG. 1 shows an exemplary elevator system 10 retrofitted to enable voice control according to an embodiment of the present disclosure. Prior to being retrofitted as described herein, the elevator system 10 may be a conventional system including an elevator button panel 12 that is located in an elevator 11 and has buttons corresponding to each floor 13-1, 13-2, . . . , 13-*n* serviced by the elevator 11. The elevator button panel 12 may also include door open and close buttons for operating a door of the elevator 11, an emergency call button, etc. On each floor 13-1, 13-2, . . . , 13-*n*, the elevator system 10 may have a respective elevator call panel 14-1, 14-2, . . . 14-*n* that includes up and down elevator call buttons (or a single elevator call button in the case of the lowest or highest floor). In a machine room 15, typically located above the highest floor 13-*n* that is serviced by the elevator 11, there may be equipment 16 for moving the elevator 11, such as a pulley system for raising and lower the elevator 11, wiring for transmitting commands to the elevator to actuate doors, etc. The equipment 16 may be controlled by an elevator controller 18 (e.g., a computer) that is connected to the elevator button panel 12 and to each of the elevator call panels 14-1, 14-2, . . . 14-*n* (collectively, elevator call panels 14). In particular, the elevator controller 18 may be operable to control the elevator 11 (e.g., via equipment 16) in response to signals received from the elevator button panel 12 and the plurality of elevator call panels 14. When a button is pressed on the elevator button panel 12 or on one of the elevator call panels 14, a corresponding signal is transmitted to the elevator controller 18 for controlling the elevator 11 accordingly. Conventionally, the connections between the controller 18 and the panels 12, 14 may be dedicated, parallel signal paths as depicted schematically in FIG. 1, requiring extensive wiring.

For the enablement of voice control as described herein, the system 10 may be retrofitted with an apparatus 100 comprising a plurality of main boards 110-0, 110-1, 110-2, . . . , 110-*n* (collectively, main boards 110), one or more auxiliary output relay boards 120-1, 120-2, . . . , 120-*m* (collectively, auxiliary output relay boards 120), and a controller area network (CAN) bus 130. Unlike prior attempts to design a voice-controlled elevator, the apparatus 100 employs a modular approach in which the capability of a given main board 110 may be expanded as needed using one or more auxiliary output relay boards 120 and the CAN bus 130, allowing the apparatus 100 to retrofit any conventional elevator system irrespective of the number of floors in the building and the complexity of the desired elevator operation. Thus, advantageously, all of the main boards 110 may be identically fabricated and all of the auxiliary output relay boards 120 may likewise be identically fabricated, making mass production practically feasible despite the diversity of elevator system implementations ranging from small two-story buildings to skyscrapers.

The plurality of main boards 110 may include a first main board 110-0 to be installed within the elevator 11 adjacent to the elevator button panel 12 as well as two or more additional main boards 110-1, 110-2, . . . , 110-*n* to be installed on respective floors 13-1, 13-2, . . . , 13-*n* adjacent to the respective elevator call panels 14-1, 14-2, . . . , 14-*n*. The first main board 110-0 may receive and interpret voice commands of passengers riding in the elevator 11, such as floor commands (e.g., "third floor," "basement," etc.) or door commands (e.g., "open," "close," etc.), while the additional main boards 110-1, 110-2, . . . , 110-*n* may receive and interpret voice commands of people outside the elevator, such as elevator call commands (e.g., "going up" or "going down"). In response to a given voice command, the main board 110 may output a signal to the adjacent elevator button panel 12 in the case of the first main board 110-0 or to the adjacent elevator call panel 14-1, 14-2, . . . , 14-*n* in the case of each respective additional main board 110-1, 110-2, . . . , 110-*n*. The elevator button panel 12 or elevator call panel 14 may treat the input from the adjacent main board 110 equivalently to a manual button press and thus may signal the controller 18 accordingly, such that the controller 18 cannot distinguish between manual operation and voice control. (Indeed, it is contemplated that both manual and voice control may be simultaneously possible.) The controller 18 may then control the elevator 11 (e.g., via equipment 16) in response to the voice commands.

As noted above, the first main board 110-0 that is connected to the elevator button panel 12 and the additional main boards 110-1, 110-2, . . . , 110-*n* that are connected to the respective elevator call panels 14-1, 14-2, . . . , 14-*n* may all advantageously be identically fabricated. Moreover, and even more importantly, the first main board 110-0 may be fabricated identically for every customer without regard to the particular needs of the building such as the number of floors or complexity of the desired elevator operation. To this end, the apparatus 100 may further include the one or more auxiliary output relay boards 120, which may be conveniently installed adjacent to the first main board 110-0 and to the elevator button panel 12. Depending on the number of floors or, more generally, the number of different output signals required within the elevator 11 (e.g., floor numbers, door open/close signals, emergency signals, etc.), the first main board 110-0 may be expanded by a number of auxiliary output relay boards 120 as required, which may be connected together (e.g., daisy chained) and to the first main board 110-0 by the CAN bus 130. As the number of buttons on the elevator button panel 12 exceeds the output capability of the first main board 110-0, each additional auxiliary output relay board 120 may be connected to the elevator button panel 12 to provide voice-controlled operation of additional buttons. For example, the first main board 110-0 may output signals directly to the elevator button panel 12 to open and close the door but may instruct a first auxiliary output relay board 120-1 to output signals to the elevator button panel 12 to select floors 1 through 15 and may instruct a second auxiliary output relay board 120-2 to output signals to the elevator button panel 12 to select floors 16 through 30. In this way, the number of buttons that need to be retrofitted with voice control may dictate the number of auxiliary output relay boards 120 employed, while the first main board 110-0 remains the same in all cases (and may further be the same as the additional main boards 110-1, 110-2, . . . , 110-*n* as described above).

Along the same lines, each additional main board 110-1, 110-2, . . . , 110-*n* may be fabricated identically to each other and identically for every customer and may further be fabricated identically to the first main board 110-0 as noted above. In the case of the additional main boards 110-1, 110-2, . . . , 110-*n*, the auxiliary output relay boards 120 may typically be unnecessary since the output capability of each main board 110 may generally be sufficient for operation of the corresponding elevator call panel 14 (which typically has only two buttons: up and down). However, it is contemplated that one or more auxiliary output relay boards 120 may in some cases be provided for any of the additional main boards 110-1, 110-2, . . . , 110-*n*, depending on the complexity of the elevator call panel 14 to be retrofitted with voice control. If so, the auxiliary output relay boards 120 may be connected using a CAN bus 130 as described above.

Figure 2:
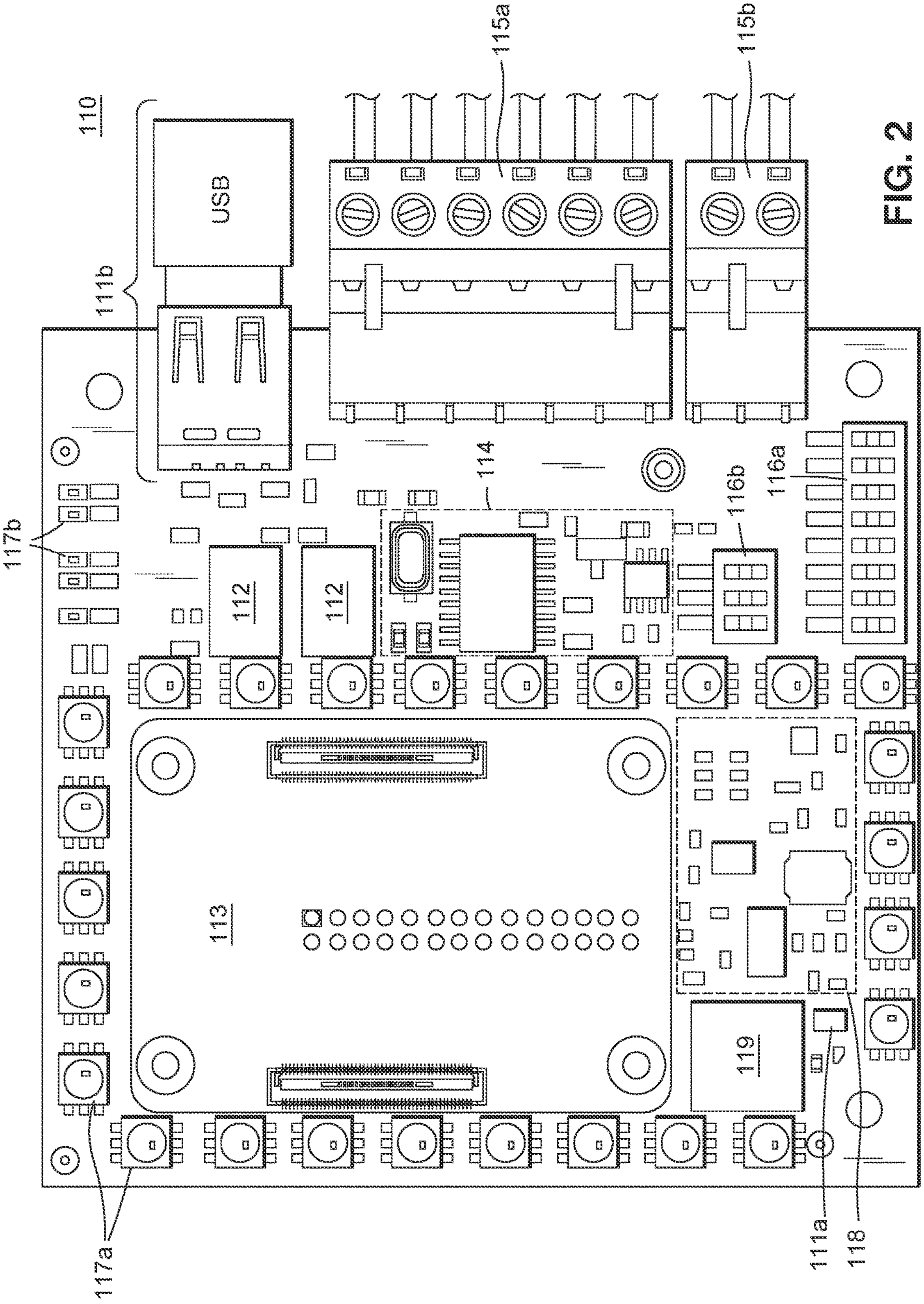
FIG. 2 shows an exemplary main board of an apparatus for retrofitting the elevator system.

FIG. 2 shows an exemplary main board 110 of the apparatus 100, which may be embodied in a printed circuit board (PCB) having a plurality of active and passive electronic components formed thereon. The main board 110 may serve as the first main board 110-0 and/or any of the additional main boards 110-1, 110-2, . . . , 110-*n* of the apparatus 100 and may preferably serve identically as both the first and additional main boards 110. The main board 110 may be mounted (using mounting holes formed in the corners thereof) on the wall of the elevator 11 near the elevator button panel 12 or on the wall of a given floor 13-1, 13-2, . . . , 13-*n* near a respective elevator call panel 14. The main board 110 may have a microphone circuit 111*a*, 111*b*, which may be an onboard microphone 111*a* such as a microelectromechanical systems (MEMS) based integrated circuit (IC) and/or an external microphone interface (e.g., USB) 111*b* connectable to an external microphone. The main board 110 may further have a plurality of onboard output relays 112, a processor 113, and a CAN bus interface 114. Wire terminals 115*a* (e.g., one or more screw terminals) may be used for electrical connection between the onboard output relays 112 and an external device, in particular, the elevator button panel 12 or elevator call panel 14 that will be voice operated by the main board 110, as well as for electrical connection between the CAN bus interface 114 and the physical wiring of the CAN bus 130 (e.g., a three-wire CAN bus 130). In the example shown in FIG. 2, the same screw terminal 115*a* is shared by the onboard output relays 112 and the CAN bus interface 114 (e.g., three wires thereof devoted to each) and may be regarded as being part of both the onboard output relays 112 and the CAN bus interface 114. Dual in-line package (DIP) switches 116*a* formed on each main board 110 may be used to select a CAN address for the board 110 as described in more detail below in relation to FIG. 4.

The processor 113 may be operable to select an output relay from among the plurality of onboard output relays 112 in response to a voice command received by the microphone circuit 111*a*, 111*b* and to output a signal to the selected output relay 112. To this end, the processor 113 may execute a voice recognition algorithm that recognizes a specific vocabulary of spoken commands including floor commands ("third floor, basement," etc.), door commands ("open," "close," etc.), elevator call commands ("going up," "going down," etc.), emergency commands, and other commands, which may be generic or tailored to the specific building where the main board 110 will be installed (or in some cases tailored to the specific elevator 11 or the specific floor 13-1, 13-2, . . . , 13*n*). A tailored vocabulary may include non-standard names for floors, such as "mezzanine," "garden," "lower level," "lobby," "penthouse," etc., depending on the needs of the particular building. Preferably, the processor 113 may be initially programmed with a tailored vocabulary at the time of installation and may be reprogrammable as needed. It is contemplated that the voice recognition algorithm may recognize multiple languages and may be capable of distinguishing and processing multiple voice commands spoken in succession or at the same time (e.g., four people speaking over each other). The voice recognition algorithm may define a wake-up word, such as "elevator," that functions as a special command that places the processor 113 in a "listening" state in which it is ready to receive and process spoken commands other than the wake-up word. Upon recognizing a voice command that corresponds to a button on the elevator button panel 12 or elevator call panel 14, the processor 113 may select the onboard output relay 112 that is connected (e.g., via wire terminal 115*a*) to a button circuit inside the panel 12, 14 that is activated by that button. In this regard, the onboard output relays 112 may be electrically connected to the panel 12, 14 such that the output signal of the onboard output relay 112 is indistinguishable from the manual pressing of the corresponding button.

In order to provide visual feedback to the user that the wake-up word has been recognized, the main board 110 may include one or more LEDs 117*a* as shown in FIG. 2. The processor 113 may be operable to illuminate the one or more LEDs 117*a* in response to the wake-up word being received by the microphone circuit 111*a*, 111*b*. The LEDs 117*a* may be RGB LEDs. It is contemplated that a technician may select the color(s) of the LEDs 117*a* (or turn the LEDs 117*a* off completely) using DIP switches 116*b*, for example. Additional indicator or diagnostic LEDs 117*b* may also be provided on the main board 110, which may be used to aid in installation troubleshooting, etc.

The system 10 may include an emergency light circuit in the elevator 11, which may be internal to an existing elevator button panel 12, for example. The emergency light circuit may be activated (e.g., by the elevator controller 18 via the equipment 16 or by emergency personnel using a key to access the elevator button panel 12 within the elevator 11) in the case of fire service operation, seismic operation, emergency power operation, etc. In order to turn off the main board 110 under such an emergency condition (as may be required for safety code compliance), it is contemplated that an input relay circuit may be connected to a power circuit 118 of the main board 110. The input relay circuit may be onboard (and part of the power circuit 118, for example) or external to the main board 110. The input relay circuit may be operable to cut power to the processor 113 (e.g., from a DC power input 115*b*) in response to an input signal, in particular an input signal from the emergency light circuit. In this way, the input relay circuit may be driven off of the emergency light circuit such that the same signal from the controller 18 (or manual operation using emergency personnel's key) that places the elevator 11 in an emergency state may also stop voice control operation of the elevator system 10. Once the emergency is resolved, the processor 113 may automatically boot up to an operational state upon re-application of power.

As noted above, visual feedback may be provided to the user of the elevator system 10 in the form of illumination of LEDs 117*a*, 117*b* formed on the main board 110. It should be noted that other forms of feedback are contemplated as well. For example, auditory feedback (e.g., speech or a tone indicating that the system 10 is "listening" in response to the wake-up word, diagnostic tones, etc.) may be output by a speaker or buzzer 119 of the main board 110. In this way, support may be provided for visually impaired users.

Figure 3:
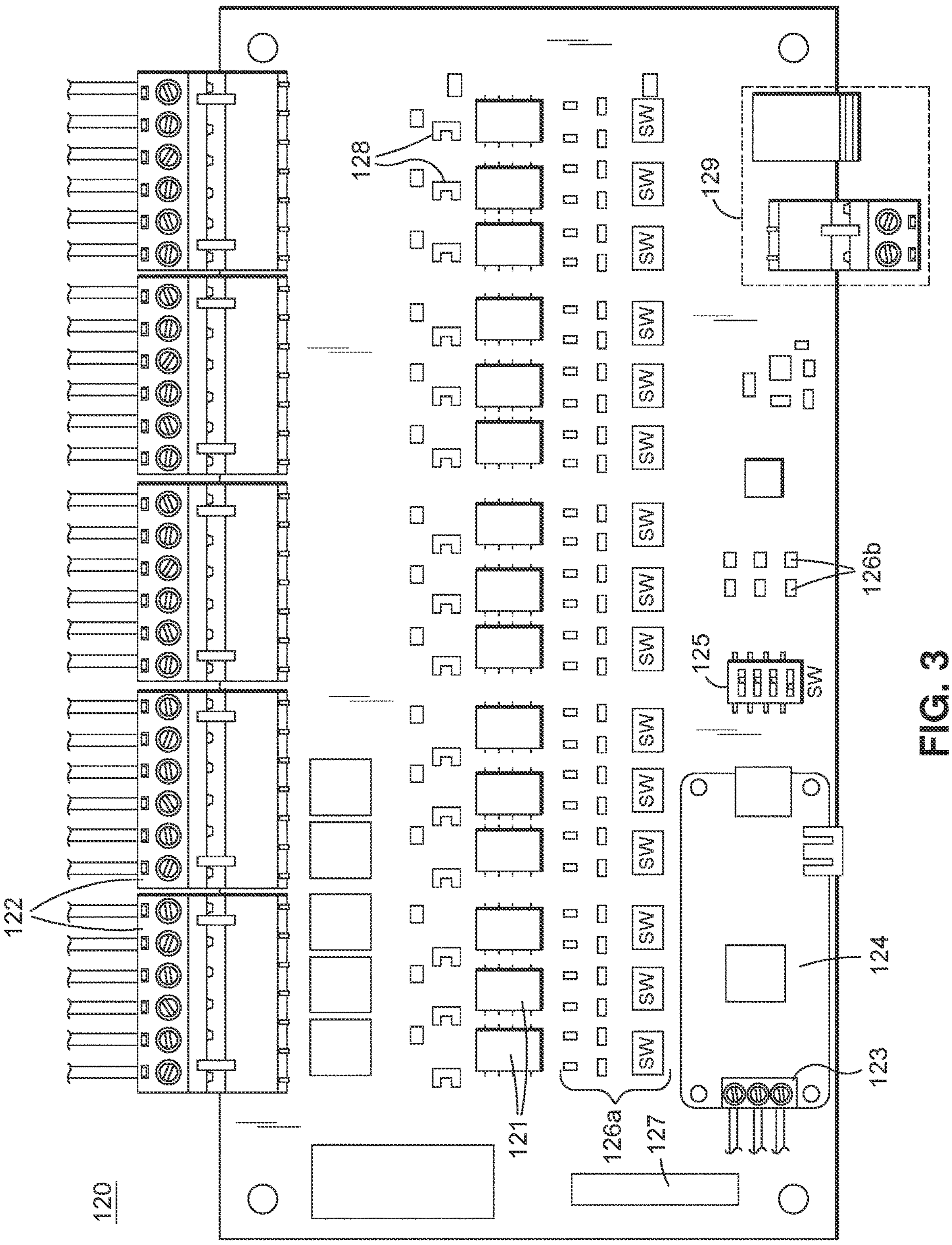
FIG. 3 shows an exemplary auxiliary output relay board of the apparatus.

FIG. 3 shows an exemplary auxiliary output relay board 120 of the apparatus 100, which may, like the main board 110, be embodied in a printed circuit board (PCB) having a plurality of active and passive electronic components formed thereon. One or more auxiliary output relay boards 120 may be mounted (using mounting holes formed in the corners thereof) on the wall of the elevator 11 near the elevator button panel 12 (or in some cases on the wall of a given floor 13-1, 13-2, . . . , 13-*n* near a respective elevator call panel 14) wherever it is necessary to expand the output capability of a main board 110. As explained above, this is most typical in the case of the first main board 110-0 located in the elevator 11 since the elevator button panel 12 typically has many more buttons than the elevator call panels 14. Each auxiliary output relay board 120 may have a plurality of additional output relays 121. Wire terminals 122 (e.g., one or more screw terminals) may be used for electrical connection between the additional output relays 121 and an external device, in particular, the elevator button panel 12 or elevator call panel 14 that will be voice operated via the auxiliary output relay board 120. The wire terminals 122 may be regarded as being part of the additional output relays 121. The auxiliary output relay board 120 may further include a CAN bus interface 123, which may be part of a processor 124 as shown, for example, and may include associated wire terminals (e.g., three wires as shown in the case of a three-wire CAN bus 130).

For any main board 110 whose output capabilities are to be expanded using one or more auxiliary output relay boards 120 (e.g., most notably the first main board 110-0 installed in the elevator 11), the CAN bus 130 (see FIG. 1) may connect the main board 110 to the auxiliary output relay board(s) 120 and enable communication therebetween. The one or more auxiliary output relay boards 120 may be addressable by the processor 113 of the main board 110 via DIP switches 125 formed on each auxiliary output relay board 120 as shown in FIG. 3. The DIP switches 125 of each auxiliary output relay board 120 may be used to select a CAN address for that board 120, allowing the main board 110 to identify a specific auxiliary output relay board 120 over the CAN bus 130. As noted above, and referring back to FIG. 2, the processor 113 may be operable to select an output relay from among the plurality of onboard output relays 112 in response to a voice command received by the microphone circuit 111*a*, 111*b* and to output a signal to the selected output relay 112. With the main board 110 and auxiliary output relay board(s) 120 being connected by the CAN bus 130, the main board 110 may be further operable to select the output relay from among the plurality of additional output relays 121 formed on the auxiliary output board(s) 120 shown in FIG. 3. Upon recognizing a voice command corresponding to a button on the elevator button panel 12 or elevator call panel 14 that is connected to an additional output relay 121 (rather than to an onboard output relay 112), the processor 113 of the main board 110 may select the particular auxiliary output relay board 120 and additional output relay 121 formed thereon via the CAN bus 130 accordingly. In this regard, each additional output relay 121 may be connected (e.g., via wire terminal 122) to a button circuit inside the panel 12, 14 such that the output signal of the additional output relay 121 is indistinguishable from the manual pressing of the corresponding button.

Owing to the modular, expandable nature of the apparatus 100, in which any of the main boards 110 may be connected to one or more auxiliary output relay boards 120 over a CAN bus 130 as needed, the number of onboard output relays 112 formed on each main board 110 may be deliberately limited for the sake of efficiency. For example, the plurality of onboard output relays 112 of each of the main boards 110 may number four or fewer, such as two output relays 112. Using two output relays 112 may be especially efficient as this may be the number needed to operate a typical elevator call panel 14. Thus, on each floor 13-1, 13-2, . . . , 13-2, the two output relays 112 of the main board 110-1, 110-2, . . . , **110-*n* may be wired to the "up" and "down" buttons, respectively, of the corresponding elevator call panel 14, such that no auxiliary output relay boards 120 are typically needed on each floor. In the case of the first main board 110-0 installed in the elevator 11, assuming it is identical to the additional main boards 110-1, 110-2, . . . , 110-*n*, the two output relays 112 may be wired to any two buttons of the elevator button panel 12, such as door "open" and "close" buttons, for example. On the other hand, the plurality of additional output relays 121 of each of the one or more auxiliary output relay boards 120 may be greater and may number, for example, fifteen or more. In the case of a fifteen-relay auxiliary output relay board 120, every auxiliary output relay board 120 may expand the main board 110 to allow voice-controlled operation of fifteen additional buttons (e.g., floors 1 through 15, floors 16 through 30, etc.). Once the auxiliary output relay board(s) 120 are wired to the button panel 12, the processor 110 of the main board 110 can operate each button in response to a corresponding voice command by broadcasting a signal over the CAN bus 130. For example, the processor 113 may output a signal on the CAN bus 130 including an address of the relevant auxiliary output relay board 120. The processor 124 of the auxiliary output relay board 120 may then activate the particular relay 121** as indicated by the signal.

The number of auxiliary output relay boards 120 connected over a CAN bus 130 with a given main board 110 may depend generally on the size and complexity of the elevator system 10. It is contemplated that as many as twenty auxiliary output relay boards 120 (or even more) may be linked together and connected to the same main board 110 in some cases. Such large number of auxiliary output relay boards 120 may be used to provide corresponding output signals (to corresponding button circuits of an elevator button panel 12, for example) for upwards of two hundred fifty-five different commands/calls that may be issued by a single processor 113.

Additional features of each auxiliary output relay board 120 may include relay test buttons and associated LEDs **126*a*, additional indicator or diagnostic LEDs 126*b*, and a diagnostic header 127, which may be used to aid in installation troubleshooting, etc. Jumpers 128 corresponding to each relay 121 may be used to select shared vs. individual common return. Each auxiliary output relay board 120 may further include a DC power supply 129**.

Figure 4:
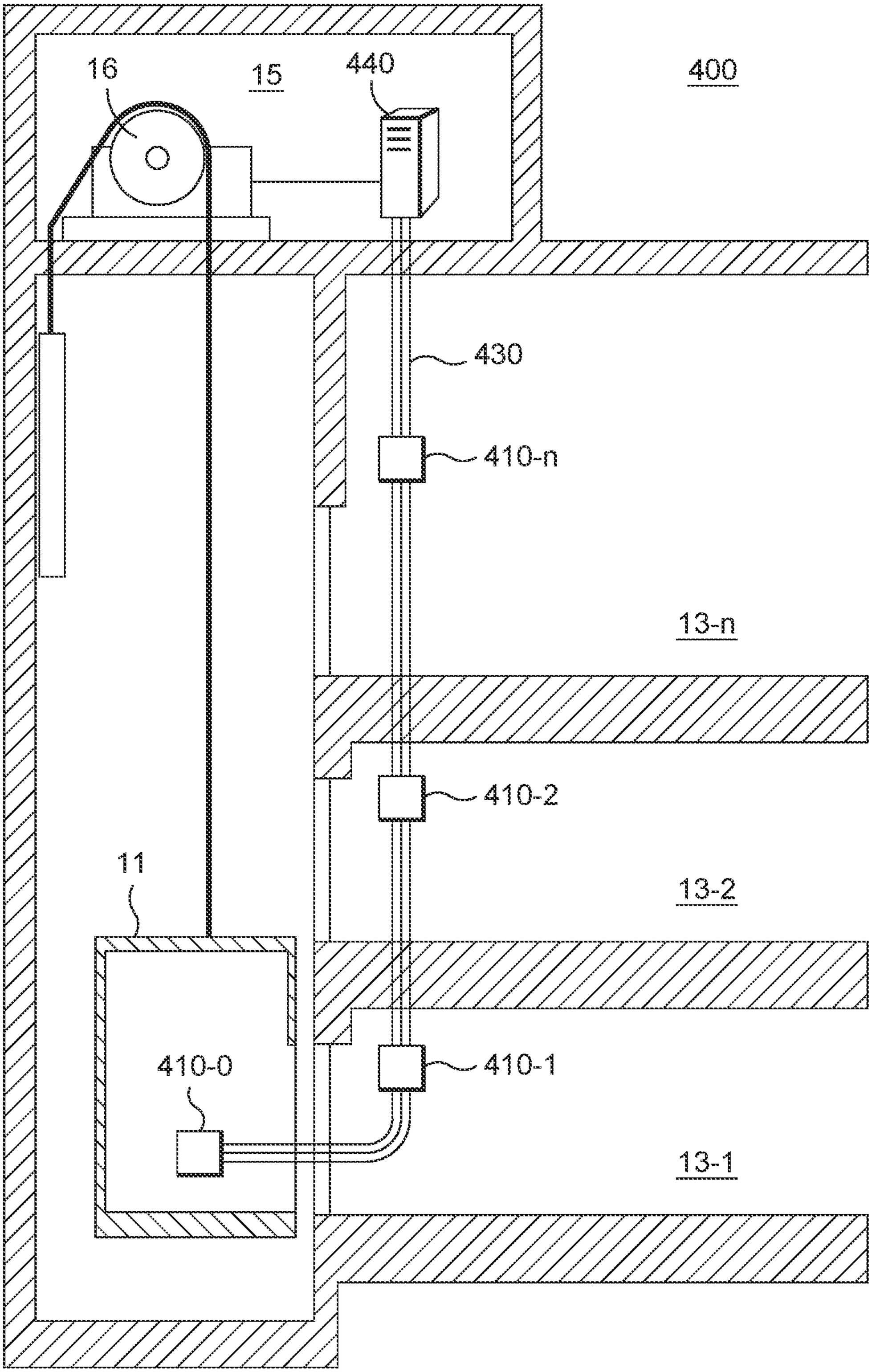
FIG. 4 shows another exemplary voice-controlled elevator system according to an embodiment of the present disclosure.

FIG. 4 shows another exemplary voice-controlled elevator system 400 according to an embodiment of the present disclosure. Whereas the elevator system 10 shown in FIG. 1 is an example of a retrofitted system incorporating the apparatus 100 into an otherwise conventional elevator system, the elevator system 400 is an example of a scratch-built elevator system that is initially designed for voice operation. The elevator system 400 may be installed in a building having the same elevator 11, floors 13-1, 13-2, . . . , **13-*n*, and machine room 15 with equipment 16 for moving the elevator 11 as described in relation to FIG. 1. Since the elevator system 400 is originally built for voice operation, the conventional elevator button panel 12 and elevator call panels 14 may be absent. Instead, the elevator system 400 may include a plurality of main boards 410 that may be the same as the main board 110 shown in FIG. 2, a CAN bus 430 (e.g., a three-wire CAN bus), and an elevator controller 440 (e.g., a computer) that may be installed in the machine room 15 instead of a conventional elevator controller 18 of the building. The plurality of main boards 410 may include a first main board 410-0 installed in the elevator 11 and two or more additional main boards 410-1, 410-2, . . . , 410-*n* installed on respective floors 13-1, 13-2, . . . , 13-*n*. All of the main boards 410 may be identical to each other. Whereas the main boards 110 of the apparatus 100 used in the retrofit system 10 described in relation to FIG. 1 may communicate only with corresponding panels 12, 14 of a conventional system (which in turn communicate with the conventional elevator controller 18), the main boards 410 may communicate directly with the elevator controller 440 over the CAN bus 430. Thus, the main boards 410 may be thought of as combining the function of the main boards 100 in interpreting voice commands with the function of the panels 12, 14 in conveying an instruction to the equipment 16 in the machine room 15, making the panels 12, 14** unnecessary.

As noted above, each of the main boards 410 may be the same as the exemplary main board 110 shown in FIG. 2. In particular, the first main board 410-0 (installed in the elevator 11) may have the microphone circuit **111*a*, 111*b* and the processor 113, which in the case of the first main board 410-0 may be programmed to output a floor select signal in response to a voice command received by the microphone circuit 111*a*, 111*b*. Instead of selecting an onboard relay 112 (or additional relay 121 of an auxiliary output relay board 120), the processor 113 may simply output the floor select signal to the CAN bus 430 (via the CAN bus interface 114, 115*a*) to be received by the elevator controller 440. The elevator controller 400 may then control the elevator 11 (e.g., via the equipment 16) to move to a floor indicated by the floor select signal, open the doors, etc. Likewise, the two or more additional main boards 410-1, 410-2, . . . , 410-*n* (installed on respective floors 13-1, 13-2, . . . , 13-*n* accessible to the elevator 11) may have the microphone circuit 111*a*, 111*b* and the processor 113, which in this case may be programmed to output an elevator call signal in response to a voice command received by the microphone circuit 111*a*, 111*b*. Here, as well, the processor 113 may simply output the elevator call signal to the CAN bus 430 (rather than selecting a relay 112, 121), which may be received by the elevator controller 440. The elevator controller 400 may then control the elevator 11 (e.g., via the equipment 16) to move to a floor indicated by the elevator call signal, open the doors, etc. The elevator controller 440 may be operable to control the elevator 11 (e.g., via the equipment 16) in response to the floor select signals, elevator call signals, and/or other signals received from the main boards 410. The CAN bus 430 may connect the first main board 410-0, the two or more additional main boards 410-1, 410-2, . . . , 410-*n*, and the elevator controller 440. To this end, the first main board 410-0 and the two or more additional main boards 410-1, 410-2, . . . , 410-*n* may be addressable by the elevator controller 440 via the DIP switches 116*a* formed on each main board 410 as shown in FIG. 2. The DIP switches 116*a* of each main board 410 may be used to select a CAN address for that board 410, allowing the elevator controller 440 to identify a specific main board 410 over the CAN bus 430. In this way, the elevator controller 440 may be able to identify, for example, which floor 13-1, 13-2, . . . , 13-*n* a given elevator call ("up" or "down") signal is coming from and control the elevator 11** accordingly.

As noted above, the main boards 410 of the system 400 may be the same as the main boards 110 of the apparatus 100. This may have the advantage of making mass production simpler and more efficient, for example. However, it is also contemplated that the main boards 110, 410 may omit one or more components depending on their implementation in an apparatus 100 for retrofitting an elevator system 10 or in a scratch-built voice-controlled elevator system 400. For example, the main boards 410 may, in some cases, omit the onboard relays 112 (and a corresponding portion of wire terminals 115*a*) since they will not need to output signals to any panels 12, 14. On the other hand, the main boards 110 of the apparatus 100 may, in some cases, omit the DIP switches 116*a* since they will not necessarily need to be addressed on the CAN bus 130 as the main boards 410 may need to be individually addressed on the CAN bus 430 by the elevator controller 440. (Instead, the DIP switches 125 shown in FIG. 3 may enable each main board 110 to address any auxiliary output relay boards 120 over the CAN bus 130.)

In either the retrofitted system 10 or the scratch-built system 400, voice commands may be received by each main board 110, 410 and processed so as to operate floor selections, door open/close operations, elevator call operations, and emergency commands ("help" or "call for help") as mentioned above. Additional voice commands that may be used in either system (e.g., either as an output to an onboard output relay 112 or additional output relay 121 over the CAN bus 130 or as a signal on the CAN bus 430 directly to the elevator controller 440) to operate various other features that may exist in the elevator 11 (or on a given floor 13-1, 13-2, . . . , 13-*n*) including, for example, music selection, air conditioning control, information requests, directory assistance ("Elevator, what floor is the fitness room on?"), etc. Any and all such functionality may be fully voice-automated using the boards 110, 120 of the apparatus 100 or using the boards 410 of the system 400. Owing to the readily expandable nature of the apparatus 100 using auxiliary output relay boards 120, as well as the CAN bus communication over the CAN bus 130, 430, such functionality may be efficiently implemented on a mass scale using identically fabricated main boards 110, 410 as described herein.

Throughout the above disclosure, a single elevator 11 is discussed for the sake of simplicity. However, the disclosure is not intended to be so limited. For example, the elevator 11 may be one of a plurality of elevators in an elevator bank that serves the same set of floors 13-1, 13-2, . . . , 13-*n* or different over overlapping sets of floors. In the case of the retrofitted system 10 shown in FIG. 1, the main boards 110, auxiliary output relay boards 120, and CAN bus(es) 130 of the apparatus 100 may simply be duplicated for any such elevators 11 and floors 13-1, 13-2, . . . , 13-*n* of such a complicated building, with each board 110, 120 communicating exclusively with its corresponding panel 12, 14. In the case of the scratch-built system 400, it is contemplated that a single elevator controller 440 may serve multiple elevators 11 for increased efficiency, with the various main boards 410 associated with each elevator 11 sharing the same CAN bus 430. For example, the DIP switches 116*a* (see FIG. 4) designating the address of each board 410 may specify an elevator ID or (even an elevator bank ID) in addition to a floor number. Alternatively, multiple independent systems 400 may be installed in the building.

From the perspective of a user, both the retrofitted system 10 and the system 400 may provide seamless voice-controlled operation and thus a hands-free (germ-free) experience from the moment of calling the elevator through the elevator ride and exiting of the elevator. As an exemplary use case, a person may simply approach the elevator shaft on a given floor and say, "elevator," pausing to notice the LEDs 117*a* light up to signal that the system is listening, and continue, "going up." The voice command will be heard by a main board 110, 410 installed on the wall next to or in place of the elevator call panel 14, which may then interpret the command and activate a corresponding "up" button in the case of the main board 110 of the retrofitted system 10 or instruct an elevator controller 440 (via a CAN bus 430) in the case of the scratch-built system 400. Moments later, while inside the elevator 11, the user may say, "elevator, third floor," which will be heard and interpreted by another main board 110, 410 within the elevator 11. Again, the main board 110 may activate the corresponding "10" button, this time perhaps by broadcasting a signal on a CAN bus 130 connected to an auxiliary output relay board 120 connected to the elevator button panel 12. In the case of the system 400, the main board 440 in the elevator 11 may simply instruct the elevator controller 440 (via the CAN bus 430). In this way, the passenger may arrive at his/her destination easily and conveniently without ever needing to touch any buttons. Owing to the uniquely modular/expandable system described herein, the owner or manager of the building may provide this functionality to its tenants or guests/public at relatively low cost without having to commission a custom-built system to meet the building's particular needs.

The functionality described above in relation to the elevator controller 440 shown in FIG. 4 may be wholly or partly embodied in one or more computers including a processor (e.g., a CPU), a system memory (e.g., RAM), and a hard drive or other secondary storage device. The processor of the elevator controller 440, and likewise the processors 113, 124 of the main board 110, 410 and auxiliary output relay board 120, may execute one or more computer programs, which may be tangibly embodied along with an operating system in a computer-readable medium, e.g., the secondary storage device. The operating system and computer programs may be loaded from the secondary storage device into the system memory to be executed by the processor. It is contemplated that the voice recognition algorithms described herein may preferably employ edge computing rather than cloud-based approaches and thus need not require network communication.

The above computer programs may comprise program instructions which, when executed by the processor, cause the processor to perform operations in accordance with the various embodiments of the present disclosure. The computer programs may be provided to the secondary storage by or otherwise reside on an external computer-readable medium such as a DVD-ROM, an optical recording medium such as a CD or Blu-ray Disk, a magneto-optic recording medium such as an MO, a semiconductor memory such as an IC card, a tape medium, a mechanically encoded medium such as a punch card, etc. Other examples of computer-readable media that may store programs in relation to the disclosed embodiments include a RAM or hard disk in a server system connected to a communication network such as a dedicated network or the Internet, with the program being provided to the computer via the network. Such program storage media may, in some embodiments, be non-transitory, thus excluding transitory signals per se, such as radio waves or other electromagnetic waves. Examples of program instructions stored on a computer-readable medium may include, in addition to code executable by a processor, state information for execution by programmable circuitry such as a field-programmable gate arrays (FPGA) or programmable logic array (PLA).

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. An apparatus for retrofitting an elevator system to enable voice control, the apparatus comprising:

a plurality of main boards including a first main board installable within an elevator adjacent to an elevator button panel and two or more additional main boards installable on respective floors adjacent to respective elevator call panels, each of the main boards having a microphone circuit, a plurality of onboard output relays, and a processor operable to select an output relay from among the plurality of onboard output relays in response to a voice command received by the microphone circuit and to output a signal to the selected output relay;

one or more auxiliary output relay boards installable within the elevator adjacent to the elevator button panel, each of the one or more auxiliary output relay boards having a plurality of additional output relays, wherein the processor of the first main board is further operable to select the output relay from among the plurality of additional output relays; and a controller area network (CAN) bus connecting the first main board to the one or more auxiliary output relay boards.

2. The apparatus of claim 1, wherein the one or more auxiliary output relay boards are addressable by the processor of the first main board via dual in-line package (DIP) switches.

3. The apparatus of claim 1, wherein the CAN bus comprises a three-wire CAN bus.

4. The apparatus of claim 1, wherein the plurality of additional output relays of each of the one or more auxiliary output relay boards numbers fifteen or more.

5. The apparatus of claim 1, wherein the plurality of onboard output relays of each of the main boards numbers four or fewer.

6. The apparatus of claim 1, wherein each of the main boards further has one or more LEDs, and the processor of each of the main boards is further operable to illuminate the one or more LEDs in response to a wake-up word received by the microphone circuit.

7. The apparatus of claim 1, wherein each of the main boards further has an onboard input relay circuit connected to a power circuit of the processor, the onboard input relay circuit being operable to cut power to the processor in response to an input signal.

8. An elevator system retrofitted to enable voice control, the elevator system comprising:

an elevator button panel in an elevator;

a plurality of elevator call panels on respective floors accessible by the elevator;

a controller operable to control the elevator in response to signals received from the elevator button panel and the plurality of elevator call panels;

a first main board installed within the elevator adjacent to the elevator button panel, the first main board having a microphone circuit, a plurality of onboard output relays connected to the elevator button panel, and a processor operable to select an output relay from among the plurality of onboard output relays in response to a voice command received by the microphone circuit and to output a signal to the selected output relay;

two or more additional main boards installed adjacent to respective elevator call panels from among the plurality of elevator call panels, each of the two or more additional main boards having a microphone circuit, a plurality of onboard output relays connected to the respective elevator call panel, and a processor operable to select an output relay from among the plurality of onboard output relays in response to a voice command received by the microphone circuit and to output a signal to the selected output relay;

one or more auxiliary output relay boards installed within the elevator adjacent to the elevator button panel, each of the one or more auxiliary output relay boards having a plurality of additional output relays connected to the elevator button panel, wherein the processor of the first main board is further operable to select the output relay from among the plurality of additional output relays; and a controller area network (CAN) bus connecting the first main board to the one or more auxiliary output relay boards.

9. The elevator system of claim 8, wherein the one or more auxiliary output relay boards are addressable by the processor of the first main board via dual in-line package (DIP) switches.

10. The elevator system of claim 8, wherein the CAN bus comprises a three-wire CAN bus.

11. The elevator system of claim 8, wherein the plurality of additional output relays of each of the one or more auxiliary output relay boards numbers fifteen or more.

12. The elevator system of claim 8, wherein, in each of the first main board and the two or more additional main boards, the plurality of onboard output relays numbers four or fewer.

13. The elevator system of claim 8, wherein each of the first main board and the two or more additional main boards further has one or more LEDs, and, in each of the first main board and the two or more additional main boards, the processor is further operable to illuminate the one or more LEDs in response to a wake-up word received by the microphone circuit.

14. The elevator system of claim 8, further comprising an emergency light circuit in the elevator and an input relay connected to the emergency light circuit and to a power circuit of the processor, the input relay being operable to cut power to the processor in response to an input signal received from the emergency light circuit.

15. A voice-controlled elevator system comprising:

a first main board installed in an elevator, the first main board having a microphone circuit and a processor operable to output a floor select signal in response to a voice command received by the microphone circuit;

two or more additional main boards installed on respective floors accessible by the elevator, each of the two or more additional main boards having a microphone circuit and a processor operable to output an elevator call signal in response to a voice command received by the microphone circuit;

a controller operable to control the elevator in response to the floor select signal received from the first main board and the elevator call signals received from the two or more additional main boards; and a controller area network (CAN) bus connecting the first main board, the two or more additional main boards, and the controller, wherein the voice command signal and the elevator call signals are received by the controller over the CAN bus.

16. The voice-controlled elevator system of claim 15, wherein the first main board and the two or more additional main boards are addressable by the controller via dual in-line package (DIP) switches.

17. The voice-controlled elevator system of claim 15, wherein the CAN bus comprises a three-wire CAN bus.

18. The voice-controlled elevator system of claim 15, wherein each of the first main board and the two or more additional main boards further has one or more LEDs, and, in each of the first main board and the two or more additional main boards, the processor is further operable to illuminate the one or more LEDs in response to a wake-up word received by the microphone circuit.

19. The voice-controlled elevator system of claim 15, wherein the processor of the first main board is further operable to output a door control signal in response to a voice command received by the microphone circuit, and the controller is further operable to control a door of the elevator in response to the door control signal received from the first main board.

20. The voice-controlled elevator system of claim 15, wherein the processor of the first main board is further operable to output an emergency signal in response to a voice command received by the microphone circuit, and the controller is further operable to control an alarm in response to the emergency signal received from the first main board.

* * * * *